US008208673B2

(12) United States Patent
Graham et al.

(10) Patent No.: US 8,208,673 B2
(45) Date of Patent: Jun. 26, 2012

(54) MINIATURIZED ACOUSTIC BOOM STRUCTURE FOR REDUCING MICROPHONE WIND NOISE AND ESD SUSCEPTIBILITY

(75) Inventors: John Steven Graham, Scotts Valley, CA (US); Osman Kemal Isvan, Aptos, CA (US)

(73) Assignee: Plantronics, Inc, Santa Cruz, CA (US)

( * ) Notice: Subject to any disclaimer, the term of this patent is extended or adjusted under 35 U.S.C. 154(b) by 997 days.

(21) Appl. No.: 12/114,583

(22) Filed: May 2, 2008

(65) Prior Publication Data

US 2009/0274332 A1 Nov. 5, 2009

(51) Int. Cl.

| | |
|---|---|
| ***H04R 25/00*** | (2006.01) |
| ***H04R 1/02*** | (2006.01) |
| ***H04M 9/00*** | (2006.01) |
| ***H04M 1/00*** | (2006.01) |
| ***F01N 13/00*** | (2010.01) |

(52) U.S. Cl. ........ 381/376; 381/375; 381/390; 379/430; 379/433.03; 181/242

(58) Field of Classification Search .................. 381/355, 381/359, 367, 371, 374, 375, 376, 381, 390; 379/430, 433.03; 181/242
See application file for complete search history.

(56) References Cited

U.S. PATENT DOCUMENTS

| | | | | |
|---|---|---|---|---|
| 2,520,706 | A * | 8/1950 | Anderson et al. | 181/242 |
| 4,570,746 | A * | 2/1986 | Das et al. | 381/359 |
| 4,720,857 | A * | 1/1988 | Burris et al. | 379/430 |
| 4,875,233 | A * | 10/1989 | Derhaag et al. | 379/430 |
| 5,615,273 | A * | 3/1997 | Lucey et al. | 381/361 |
| 6,935,458 | B2 * | 8/2005 | Owens | 181/205 |
| 7,062,059 | B1 * | 6/2006 | Bobisuthi | 381/375 |
| 7,190,797 | B1 * | 3/2007 | Johnston et al. | 381/74 |
| 7,349,547 | B1 | 3/2008 | Isvan | |
| 7,391,863 | B2 * | 6/2008 | Viduya et al. | 379/430 |
| 7,945,063 | B2 * | 5/2011 | Soutar et al. | 381/189 |
| 8,090,135 | B2 * | 1/2012 | Lin | 381/381 |
| 8,111,853 | B2 * | 2/2012 | Isvan | 381/337 |
| 2004/0156012 | A1 | 8/2004 | Jannard et al. | |
| 2004/0258267 | A1 * | 12/2004 | Christensen et al. | 381/355 |
| 2007/0116315 | A1 | 5/2007 | Darbut | |

FOREIGN PATENT DOCUMENTS

| | | |
|---|---|---|
| WO | 9615646 | 5/1996 |

OTHER PUBLICATIONS

International Searching Authority: European Patent Office. International Search Report: PCT/US2009/034894. May 2009. Netherlands, Rijswijk. International Searching Authority: European Patent Office. Written Opinion of the International Searching Authority: PCT/US2009/034894. May 2009. Germany, Munich.

* cited by examiner

*Primary Examiner* — Anh Mai
*Assistant Examiner* — Joselito Baisa
(74) *Attorney, Agent, or Firm* — Chuang Intellectual Property Law

(57) ABSTRACT

A miniaturized acoustic boom structure includes a microphone boom housing having a wind screen and a microphone pod configured to hold a microphone. The microphone pod has an outer surface secured to an inner surface of the microphone boom housing, an interior having one or more surfaces configured to form an acoustic seal around at least a portion of the periphery of the microphone, and first and second pod port openings. The first and second pod port openings provide sound wave access to opposing sides of a diaphragm of the microphone, and are shaped and spaced away from the first and second microphone ports of the microphone so that an acoustic path length between the first and second pod port openings is greater than an acoustic path length between the first and second microphone ports.

25 Claims, 5 Drawing Sheets

MINIATURIZED ACOUSTIC BOOM STRUCTURE FOR REDUCING MICROPHONE WIND NOISE AND ESD SUSCEPTIBILITY

FIELD OF THE INVENTION

The present invention relates to headsets. More specifically, the present invention relates to reducing wind noise in headsets.

BACKGROUND OF THE INVENTION

In windy conditions, headset microphones often generate wind-induced noise, or what is often referred to as "wind noise". Wind noise is undesirable since it disrupts speech intelligibility and makes it difficult to comply with telecommunications network noise-limit regulations.

Various different approaches to reducing wind noise, or countering its effects, are employed in communications headsets. One approach involves subjecting the wind noise to digital signal processing (DSP) filtering algorithms, in an attempt to filter out the wind noise. While DSP techniques are somewhat successful in removing wind noise, they are not entirely effective and do not directly address the source of the problem. DSP approaches also impair speech quality, due to disruptive artifacts caused by filtering.

Another, more direct, approach to reducing wind noise involves using what is known as a "wind screen." FIG. 1 is a drawing of a conventional headset 100 that has a wind screen 102. The wind screen 102 is placed over the headset microphone, which is typically located at the tip (i.e., the distal end) of the headset's microphone boom 104, to shield the microphone from wind. A typical wind screen 102 comprises a bulbous structure (sometimes referred to as a "wind sock") made of foam or some other porous material, as illustrated in FIG. 2.

Wind noise can be particularly problematic in headsets that employ short-length microphone booms, as are commonly employed in modern behind-the-ear Bluetooth headsets, such as the Bluetooth headset 300 shown in FIG. 3. Similar to the conventional binaural headband-based headset 100 in FIG. 1, the headset 300 has a microphone boom 302 with a wind screen 304 covering a microphone at the distal end of the boom 302. Because the boom 302 is short, however, when the headset 300 is being worn, the distance between the microphone and the headset wearer's mouth is greater than it is for the conventional headband-based headset 100 in FIG. 1. This requires additional amplification to deliver the correct transmitted speech level to the telecommunications network, but the extra amplification also applies to the wind noise. Given that wind appearing at the microphone is, for the most part, independent of the microphone boom length, the signal-to-noise ratio at the output of the microphone is, therefore, also degraded. So, while the problem of wind noise must be addressed in most any type of headset, it deserves particular attention in headsets that employ short-length microphone booms.

In general, the further a wind screen is separated from the microphone, the more effective the wind screen is at deflecting wind away from the headset's microphone. For this reason, prior art approaches tend to increase the diameter of the microphone boom, either along the boom's entire length, or towards the distal end of the boom, as is done in the behind-the-ear headset 300 in FIG. 3. The increased diameter of the microphone boom provides the ability to increase the separation between the wind screen and the microphone. However, the resulting microphone is often larger and less discreet than desired, and, in some cases, can even be obtrusive and uncomfortable for the headset wearer.

It would be desirable, therefore, to have a microphone boom structure for a communications headset that is effective at reducing wind noise, yet which is also small, discreet and unobtrusive to the headset wearer.

SUMMARY OF THE INVENTION

Miniaturized acoustic boom structures for headsets are disclosed. An exemplary miniaturized acoustic boom structure includes a microphone boom housing having a wind screen and a microphone pod configured to hold a microphone. The microphone pod has an outer surface secured to an inner surface of the microphone boom housing, an interior having one or more surfaces configured to form an acoustic seal around at least a portion of the periphery of the microphone, and one or more pod port openings spaced away from one or more microphone ports of the microphone. The outer surface of the microphone pod has a wide cross-section near where the microphone pod is secured to the inner surface of the microphone boom housing and a relatively narrow cross-section at the one or more pod port openings.

In one embodiment of the invention, the microphone pod includes first and second pod port openings that provide sound wave access to opposing sides of a diaphragm of the microphone. The first and second pod port openings are spaced away from first and second microphone ports of the microphone so that an acoustic path length between the first and second pod port openings is greater than an acoustic path length between the first and second microphone ports.

Further features and advantages of the present invention, as well as the structure and operation of the above-summarized and other exemplary embodiments of the invention, are described in detail below with respect to accompanying drawings, in which like reference numbers are used to indicate identical or functionally similar elements.

DETAILED DESCRIPTION

Figure 1:
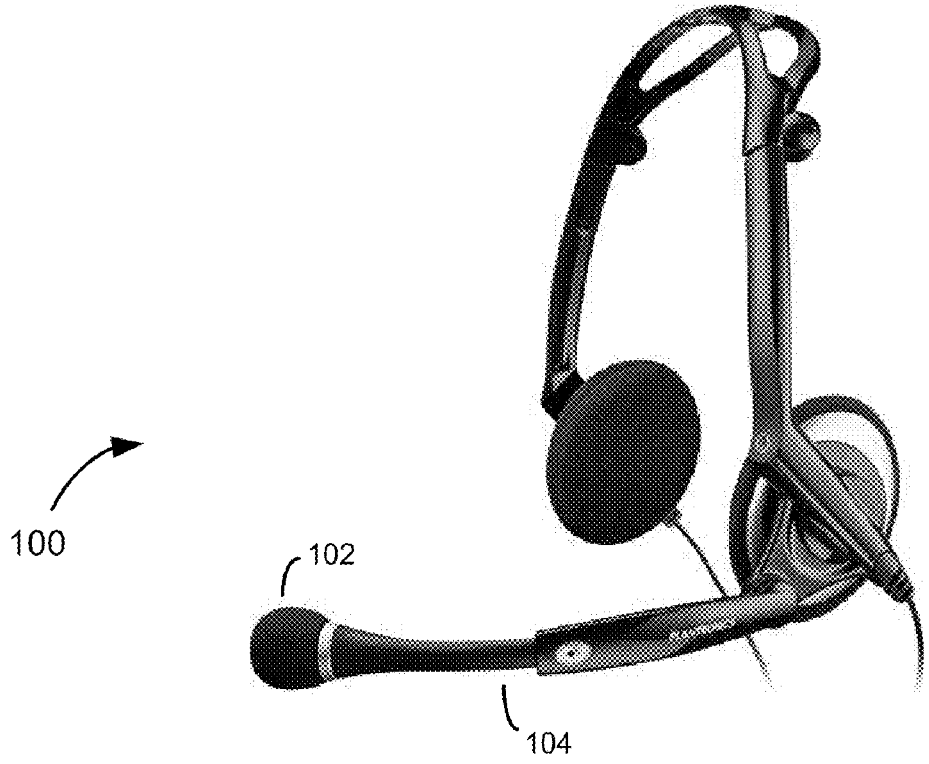
FIGURE 1 (Prior Art)
FIG. 1 is a drawing of a conventional headset equipped with a wind screen.
Figure 2:
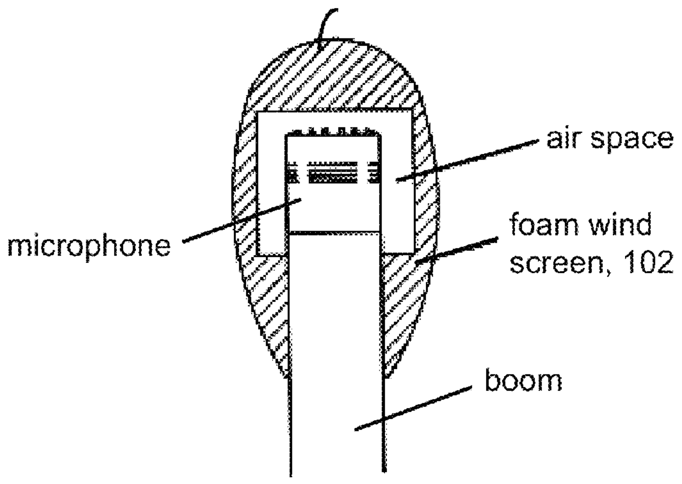
FIGURE 2 (Prior Art)
FIG. 2 is a drawing showing a typical microphone wind screen and its physical relationship to an internal microphone and microphone boom.
Figure 3:
FIGURE 3 (Prior Art)
FIG. 3 is a drawing of a typical behind-the-ear Bluetooth headset employing a short-length microphone boom.
Figure 4:
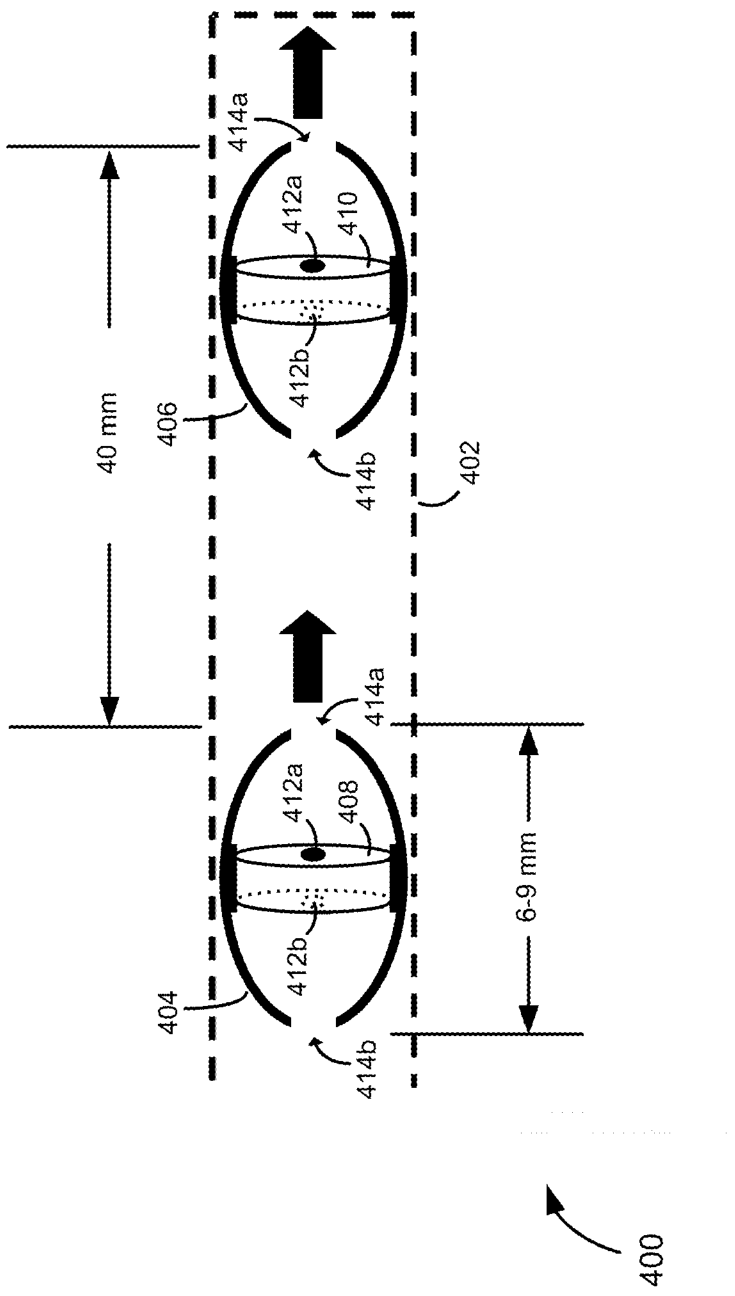
FIG. 4 is a cross-sectional drawing of a miniaturized acoustic boom structure, according to an embodiment of the present invention.

Referring to FIG. 4, there is shown a cross-sectional drawing of miniaturized acoustic boom structure 400 for a headset, according to an embodiment of the present invention. The miniaturized acoustic boom structure 400 comprises a microphone boom housing 402 and first and second microphone pods 404 and 406 secured to an inner wall of the microphone boom housing 402. The microphone boom housing 402, or a substantial portion thereof, comprises a perforated, porous or mesh-like material, which serves as a wind screen. In the exemplary embodiment shown in FIG. 4, the microphone boom housing 402 is approximately 65 mm long and the first and second microphone pods 404 and 406 are separated from each other by about 40 mm.

According to one embodiment, the first and second microphones 408 and 410 are directional microphones, although other types of microphones (e.g., one or more omnidirectional microphones) may alternatively be used. The directional microphones 408 and 410 are oriented within the microphone boom 402, as indicated by the large directionality arrows pointing toward the distal end of the microphone boom housing 402 in FIG. 4. Two microphones are used in the exemplary embodiment shown in FIG. 4, to account for the reduced ability to take advantage of the proximity effect when the acoustic boom structure 400 is designed to have a short-length boom. For longer length booms, which are more able to take advantage of the proximity effect, a microphone boom employing only a single microphone may alternatively be used.

As shown in FIG. 4, the first and second microphone pods 404 and 406 each have a front pod port opening 414*a* and a rear pod port opening 414*b*. The front and rear pod port openings 414*a* and 414*b* provide sound wave access to opposing sides of diaphragms of the first and second directional microphones 408 and 410, via front and rear microphone ports 412*a* and 412*b*, respectively. The microphones 408 and 410 are acoustically sealed around their periphery to the first and second microphone pods 404 and 406 respectively, to assure that air cavities on both sides of each of the microphones 408 and 410 are isobaric chambers. This allows the front pod port opening 414*a* of each of the microphone pods 404 and 406 to be acoustically coupled to the front microphone port 412*a* while being decoupled from the rear microphone port 412*b*, and the rear pod port opening 414*b* of each of the microphone pods 404 and 406 to be acoustically coupled to the rear microphone port 412*b* while being decoupled from the front microphone port 412*a*.

According to one aspect of the invention, the acoustic path length between the front and rear pod port openings 414*a* and 414*b* of each of the first and second microphone pods 404 and 406 is greater than that between the front and rear microphone ports 412*a* and 412*b*. The spacing between the front and rear pod port opening 412*a* and 412*b* of each of the first and second microphone pods 404 and 406 is designed to increase the time and amplitude differences between sound waves arriving at opposite sides of the microphone diaphragms, thereby increasing the microphones' sensitivity to sound pressure. In an exemplary embodiment, the spacing between the front and rear pod port openings 412*a* and 412*b* of each of the first and second microphone pods 404 and 406 is between about 6 and 9 mm.

According to another aspect of the invention, the outer surface of the first microphone pod 404 has a wide cross-section near where the first microphone 408 is secured to the inner wall of the microphone boom housing 402 and a relatively narrow cross-section at the front and rear pod port openings 414*a* and 414*b*. Similarly, the outer surface of the second microphone pod 406 has a wide cross-section near where the second microphone 410 is secured to the inner wall of the microphone boom housing 402 and a relatively narrow cross-section at the front and rear pod port openings 414*a* and 414. In the exemplary embodiment shown in FIG. 4, the shape of each of the first and second microphone pods 404 and 408 is ovate, i.e., is egg-shaped with an outer surface that tapers from a wide medial cross-section to truncated ends defining the front and rear pod port openings 414*a* and 414*b*. Tapering the outer surfaces of the microphone pods 404 and 406 minimizes the volume inside the microphone boom housing 402 needed to accommodate the microphone pods 404 and 406. The remaining volume exterior to the microphone pods 404 and 406 allows wind-induced acoustic noise to be attenuated by dispersion as the wind-induced acoustic noise propagates from the surface of the wind screen to the front and rear pod port openings 414*a* and 414*b*. While the first and second microphone pods 404 and 406 have been described as having egg-shaped outer surfaces, other microphone pod shapes may be alternatively be used, as will be readily appreciated and understood by those of ordinary skill in the art.

Figure 5:
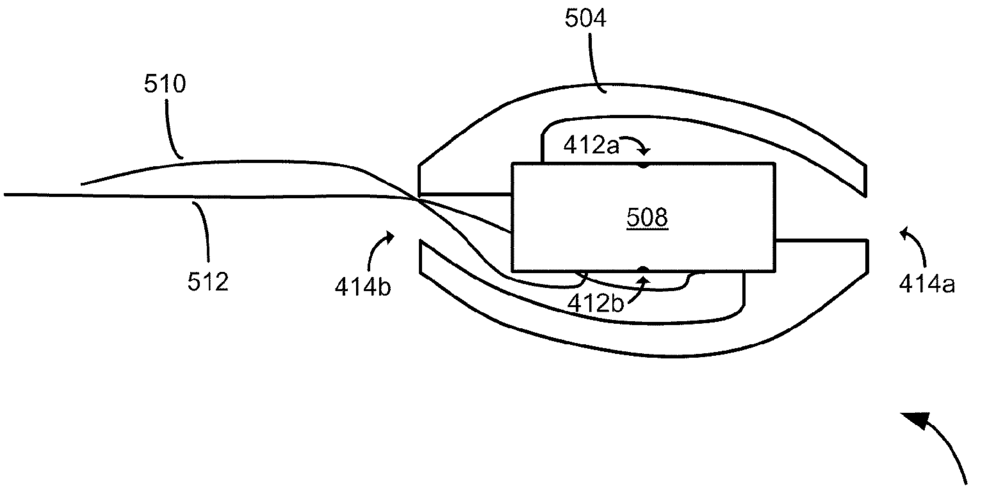
FIG. 5 is a cross-sectional drawing of an alternative microphone boom pod that may be used in the miniaturized acoustic boom structure in FIG. 4, according to an embodiment of the present invention.

In the exemplary embodiment shown in FIG. 4, the first and second microphone pods 404 and 406 are designed to hold the first and second microphones 408 and 410 so that the front and rear microphone ports 412*a* and 412*b* of each of the microphones 406 and 408 directly face the front and rear pod port openings 414*a* and 414*b*. The largest diameter (or cross-sectional dimension, if the boom housing has a non-circular cross-section) required to accommodate the first and second microphones 408 and 410, therefore, need only be approximately equal to the diameter of one of the microphones 408 and 410 or, more precisely, a microphone diameter plus two pod wall thicknesses. In an exemplary embodiment, the microphone boom housing 402 has a circular cross-section and 3-mm diameter disc microphones are used; so the cross-sectional diameter of the microphone boom housing 402 needs to be only slightly larger The diameter of the microphone boom housing 402 (or cross-sectional dimension, in the case of a non-circular cross-section boom) may be further reduced by orienting each of the microphones 408 and 410 so that their largest dimension is oriented along the length of the microphone boom 402. FIG. 5 shows, for example, an alternative microphone pod 504 that is designed to hold its microphone 508 in this manner. When the microphone pod 504 is configured in the microphone boom 402, the largest dimension of the microphone (in this case, the microphone's diameter) is oriented along the length of the boom, and the front and rear microphone ports 412*a* and 412*b* of the microphone 508 are oriented perpendicular to the front and rear pod port openings 414*a* and 414*b*.

FIG. 5 further illustrates how wires 510 and 512 of the microphone 508 may be advantageously fed through one of the pod port openings 414*a* and 414*b*, rather than having to route them along the outer surface of the microphone pod 504. (The same may be done for wires of the microphones 408 and 410 held in the first and second microphone pods 404 and 406 in FIG. 4, as will be readily appreciated and understood by those of ordinary skill in the art.) Routing the wires through the pod port openings avoids the problem of forming acoustic seals around the wires 510 and 512, as must be addressed when the wires 510 and 512 are routed along the outer surfaces of the microphone pods.

According to another aspect of invention, the microphone pods 404 and 406 are made from an electrically insulating material. Accordingly, when configured in the microphone boom housing 400, the microphone pods 404 and 406 increase the electrostatic discharge (ESD) path from the metal casings of the microphones 408 and 410 to the outside of the microphone boom housing 402. The increased ESD path provides greater discharge protection for both the microphones 408 and 410 and the headset wearer. To maximize ESD protection, the microphone pods 404 and 406 can be made to be gas tight everywhere except for the front and rear pod port openings 414*a* and 414*b*.

Figure 6:
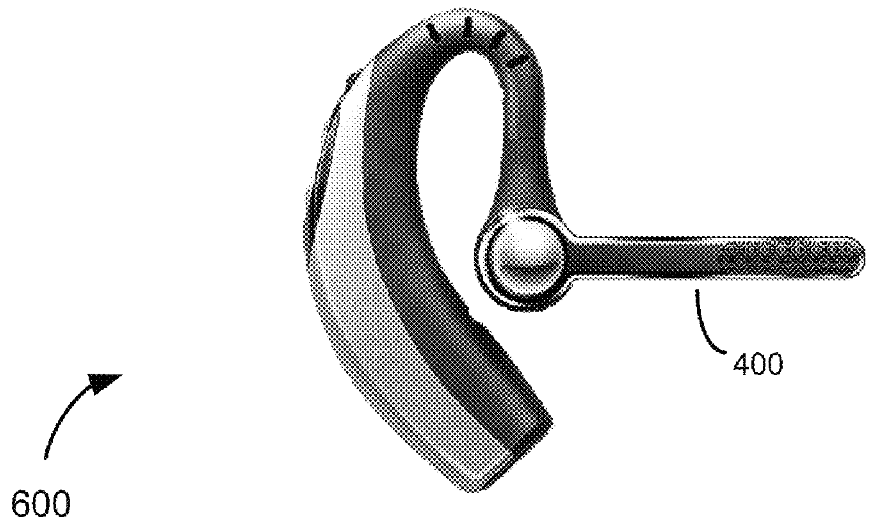
FIG. 6 is a headset equipped with the miniaturized acoustic boom structure in FIG. 4, according to an embodiment of the present invention.

The miniaturized acoustic boom structure 400 in FIG. 4 may be used in any type of headset in which wind noise reduction is desired. It is particularly advantageous to use it in short-boom headsets. FIG. 6 illustrates, for example, how the miniaturized acoustic boom structure 400 in FIG. 4 is used in a behind-the-ear Bluetooth headset 600. Use of the miniaturized boom structure 400 results in a headset 600 that is smaller and less obtrusive to wear than prior art headsets equipped with noise reducing wind screens, yet which is still as, or more, effective at reducing wind noise.

The present invention has been described with reference to specific exemplary embodiments. These exemplary embodiments are merely illustrative, and not meant to restrict the scope or applicability of the present invention in any way. Accordingly, the inventions should not be construed as being limited to any of the specific exemplary embodiments describe above, but should be construed as including any changes, substitutions and alterations that fall within the spirit and scope of the appended claims.

What is claimed is:

1. A microphone boom structure for a headset, comprising:

a microphone boom housing including a wind screen; and a first microphone pod having an outer surface secured to an inner surface of said microphone boom housing, an interior having one or more surfaces configured to form an acoustic seal around at least a portion of a periphery of a first microphone, and a first pod port opening configured to be spaced away from a first microphone port of the first microphone, wherein the outer surface of said first microphone pod has a wide cross-section near where the first microphone pod is secured to the inner surface of said microphone boom housing and a relatively narrow cross-section at the first pod port opening.

2. The microphone boom structure of claim 1 wherein the outer surface of said first microphone pod tapers from the wide cross-section near where the first microphone pod is secured to the inner surface of said microphone boom housing to the relatively narrow cross-section at the first pod port opening.

3. The microphone boom structure of claim 1 wherein the outer surface of said first microphone pod is shaped to enhance dispersion of wind-induced acoustic noise that is propagated from a surface of the wind screen to the first pod port opening.

4. The microphone boom structure of claim 1 wherein the microphone boom housing has a cross-sectional dimension at a location along its length where the first microphone pod is secured that is less than or approximately equal to a largest dimension of said first microphone.

5. The microphone boom structure of claim 1 wherein said first microphone pod includes a second pod port opening configured to be spaced away from a second microphone port of said first microphone so that an acoustic path length between the first and second pod port openings is greater than an acoustic path length between the first and second microphone ports.

6. The microphone boom structure of claim 5 wherein a spacing between the first and second pod port openings of said first microphone pod is designed so that time and amplitude differences between sound waves arriving at opposite sides of a diaphragm of the first microphone are increased, compared to if no first microphone pod was used.

7. The microphone boom structure of claim 1 wherein said first microphone pod is comprised of an electrically insulating material, said first microphone is configured within a metal case, and walls of the first microphone pod serve to increase an electrostatic discharge path length from the metal case of the first microphone to a point outside the microphone boom housing, compared to if no first microphone pod was used.

8. The microphone boom structure of claim 1, further comprising a second microphone pod having an outer surface secured to the inner surface of said microphone boom housing, an interior having one or more surfaces configured to form an acoustic seal around at least a portion of a periphery of a second microphone, and first and second pod port openings configured to be spaced away from first and second microphone ports of the second microphone so that an acoustic path length between the first and second pod port openings of said second microphone pod is greater than an acoustic path length between first and second microphone ports of said second microphone, wherein the outer surface of said second microphone pod has a wide cross-section near where the second microphone pod is secured to the inner surface of said microphone boom housing and a relatively narrow cross-section at the first and second pod port openings of the second microphone pod.

9. The microphone boom structure of claim 8 wherein the microphone boom housing has a cross-sectional dimension at a location along its length where the first microphone pod is secured that is less than or approximately equal to a largest dimension of said first microphone, and a cross-sectional dimension along its length where the second microphone pod is secured that is less than or approximately equal to a largest dimension of said second microphone.

10. The microphone boom structure of claim 1 wherein wires of the first microphone are routed through the first pod port opening of said first microphone pod.

11. A microphone boom structure for a headset, comprising:

a microphone boom housing having a wind screen; and means for securing a first microphone to a first location along a length of said microphone boom housing, wherein a cross-sectional dimension of said microphone boom housing at said first location is less than or approximately equal to a largest dimension of said first microphone.

12. The microphone boom structure of claim 11 wherein said means for securing a first microphone to a first location along a length of said microphone boom housing comprises means for enclosing the first microphone.

13. The microphone boom structure of claim 12 wherein said means for enclosing the first microphone includes first and second input ports for directing sounds waves to opposite sides of a diaphragm of said first microphone.

14. The microphone boom structure of claim 13 wherein a spacing between the first and second input ports of said means for enclosing the first microphone is designed to increase a differential pressure drive applied across the diaphragm of said first microphone resulting from sounds waves received at first and second input ports of said first microphone, compared to a differential pressure drive applied across the diaphragm in the absence of said means for enclosing the first microphone.

15. The microphone boom structure of claim 13 wherein the first and second input ports of said means for enclosing the first microphone are configured so that an acoustic path length between the first and second input ports of said means for enclosing the first microphone is greater than an acoustic path length between first and second input ports of said first microphone.

16. The microphone boom structure of claim 13 wherein an outer surface of said means for enclosing the first microphone is wider at said first location than it is at the first and second input ports of said means for enclosing the first microphone.

17. The microphone boom structure of claim 16 wherein the outer surface of said means for enclosing the first microphone tapers from said first location to the first and second input ports of said means for enclosing the first microphone.

18. The microphone boom structure of claim 13 wherein the outer surface of said means for enclosing the first microphone is shaped to enhance dispersion of wind-induced acoustic noise that is propagated from a surface of the wind screen to the first and second input ports of said means for enclosing the first microphone.

19. The microphone boom structure of claim 13 wherein the spacing between the first and second input ports of said means for enclosing the first microphone is designed so that time and amplitude differences between sound waves arriving at the opposite sides of the diaphragm of the first microphone are increased, compared to if no means for enclosing the first microphone was used.

20. The microphone boom structure of claim 13 wherein wires of said first microphone are routed through the first input port of said means for enclosing the first microphone.

21. The microphone boom structure of claim 12 wherein said means for enclosing the first microphone is comprised of an electrically insulating material, said first microphone is configured within a metal case, and walls of said means for securing the first microphone serve to increase an electrostatic discharge path length from the metal case of the first microphone to a point outside the microphone boom housing, compared to if no means for enclosing the first microphone was used.

22. The microphone boom structure of claim 11, further comprising means for securing a second microphone to a second location along the length of the said microphone boom housing.

23. The microphone boom structure of claim 22 wherein said means for securing the second microphone to said second location comprises means for enclosing the second microphone.

24. The microphone boom structure of claim 23 wherein said means for enclosing the second microphone includes first and second input ports and has an outer surface that is wider at said second location than it is at the first and second input ports of said means for enclosing the second microphone.

25. The microphone boom structure of claim 23 wherein the first and second input ports of said means for enclosing the second microphone are configured so that an acoustic path length between the first and second input ports of said means for enclosing the second microphone is greater than an acoustic path length between first and second input ports of said second microphone.

* * * * *